(12) United States Patent
Wang et al.

(10) Patent No.: US 10,594,532 B2
(45) Date of Patent: Mar. 17, 2020

(54) UPLINK TRANSMIT DIVERSITY AND PRECODING

(71) Applicant: QUALCOMM Incorporated, San Diego, CA (US)

(72) Inventors: Renqiu Wang, San Diego, CA (US); Hao Xu, Beijing (CN); Jing Jiang, San Diego, CA (US); Yi Huang, San Diego, NJ (US); Wei Zeng, Saratoga, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/228,168

(22) Filed: Dec. 20, 2018

(65) Prior Publication Data

US 2019/0123950 A1    Apr. 25, 2019

Related U.S. Application Data

(63) Continuation of application No. 15/851,180, filed on Dec. 21, 2017, now Pat. No. 10,205,618, which is a (Continued)

(51) Int. Cl.
*H04L 27/26* (2006.01)
*H04B 7/0404* (2017.01)
(Continued)

(52) U.S. Cl.
CPC ....... *H04L 27/2646* (2013.01); *H04B 7/0404* (2013.01); *H04B 7/0413* (2013.01);
(Continued)

(58) Field of Classification Search
CPC ... H04B 7/0456; H04B 7/0478; H04B 7/0482
See application file for complete search history.

(56) References Cited

U.S. PATENT DOCUMENTS 8,848,603 B2 * 9/2014 Luo .................. H04L 25/03343
370/328
2011/0103341 A1   5/2011 Ko et al.
(Continued)

FOREIGN PATENT DOCUMENTS

CN        101764636 B    6/2013
EP         1780925 A2    5/2007
(Continued)

OTHER PUBLICATIONS

International Search Report and Written Opinion—PCT/US2017/065379—ISA/EPO—dated Mar. 15, 2018.
(Continued)

*Primary Examiner* — Kevin Kim
(74) *Attorney, Agent, or Firm* — Arent Fox LLP

(57) ABSTRACT

A configurable new radio (NR) uplink (UL) transmission may use transmit diversity. A user equipment (UE) may identify an uplink transmission of at least one stream as using one of cyclic prefix orthogonal frequency division multiplexing or discrete Fourier transform spread orthogonal frequency division multiplexing. The UE may apply a precoding matrix to the at least one identified stream. The precoding matrix changes over time. The precoding matrix may change based on closed loop feedback, a precoding cycling pattern, and/or a code division multiplexing group. The UE may transmit the at least one identified stream from multiple antennas according to the applied precoding matrix.

28 Claims, 11 Drawing Sheets

Related U.S. Application Data continuation of application No. 15/834,687, filed on Dec. 7, 2017, now abandoned.

(60) Provisional application No. 62/432,390, filed on Dec. 9, 2016.

(51) Int. Cl.
  *H04B 7/06* (2006.01)
  *H04B 7/0413* (2017.01)
  *H04B 7/0417* (2017.01)
  *H04B 7/0456* (2017.01)
  *H04J 13/12* (2011.01)

(52) U.S. Cl.
  CPC ......... *H04B 7/0417* (2013.01); *H04B 7/0456* (2013.01); *H04B 7/061* (2013.01); *H04B 7/0634* (2013.01); *H04B 7/0669* (2013.01); *H04B 7/0671* (2013.01); *H04B 7/0689* (2013.01); *H04L 27/2607* (2013.01); *H04L 27/2613* (2013.01); *H04J 13/12* (2013.01); *H04L 27/2636* (2013.01)

(56) References Cited

U.S. PATENT DOCUMENTS

| | | | |
|---|---|---|---|
| 2011/0141927 A1* | 6/2011 | Luo | H04L 25/03343 370/252 |
| 2012/0069926 A1* | 3/2012 | Park | H04B 7/063 375/267 |
| 2012/0114021 A1 | 5/2012 | Chung et al. | |
| 2013/0272258 A1 | 10/2013 | Lee et al. | |
| 2014/0029650 A1* | 1/2014 | Park | H04B 7/0604 375/219 |
| 2016/0087829 A1 | 3/2016 | Jia et al. | |
| 2016/0094318 A1 | 3/2016 | Shattil et al. | |
| 2018/0167252 A1 | 6/2018 | Wang et al. | |

FOREIGN PATENT DOCUMENTS

| | | |
|---|---|---|
| EP | 2276305 A1 | 1/2011 |
| WO | WO-2012064517 A2 | 5/2012 |
| WO | WO-2012064529 A1 | 5/2012 |

OTHER PUBLICATIONS

Mitsubishi Electric: "Transmit Diversity for DFTsOFDM-Based PUCCH in Long Duration", 3GPP Draft; R1-1707804-RAN189-LPUCCH TXD_MITSUBISHI, 3rd Generation Partnership Project (3GPP), Mobile Competence Centre, 650, Route Des Lucioles, F-06921 Sophia-Antipolis Cedex, France, vol. RAN WG1, No. Hangzhou, China; 20170515-20170519 May 14, 2017 (May 14, 2017), XP051273005, Retrieved from the Internet: URL:http://www.3gpp.org/ftp/Meetings_3GPP_SYNC/RAN1/Docs/ [retrieved on May 14, 2017], 11 pages.

Qualcomm Incorporated: "DL MIMO Transmission Schemes", 3GPP Draft; R1-166379, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; 20160822-20160826 Aug. 13, 2016 (Aug. 13, 2016), XP051142362, Retrieved from the Internet: URL:http://www.3gpp.org/ftp/tsg_ran/WG1_RL1/TSGR1_86/Docs/ [retrieved on Aug. 13, 2016], 4 pages.

Samsung: "DMRS-Based Spatial Multiplexing for UL NR MIMO", 3GPP Draft; R1-1609085 NR UL NR MIMO V2, 3rd Generation Partnership Project (3GPP), Mobile Competence Centre, 650, Route Des Lucioles, F-06921 Sophia-Antipolis Cedex, France, vol. RAN WG1, No. Lisbon, Portugal; 20161010-20161014 Sep. 30, 2016, XP051158752, Retrieved from the Internet: URL:http://www.3gpp.org/ftp/tsg_ran/WG1_RL1/TSGR1_86b/Docs/ [retrieved on Sep. 30, 2016], 4 pages.

Samsung: "UL Transmit diversity for PUCCH format 1/1a/1b in LTE-A", 3GPP Draft; R1-093397, 3rd Generation Partnership Project (3GPP), Mobile Competence Centre, 650, Route Des Lucioles, F-06921 Sophia-Antipolis Cedex, France, No. Shenzhen, China; 20090819, Aug. 19, 2009, XP050351693, [retrieved on Aug. 19, 2009], 3 pages.

* cited by examiner

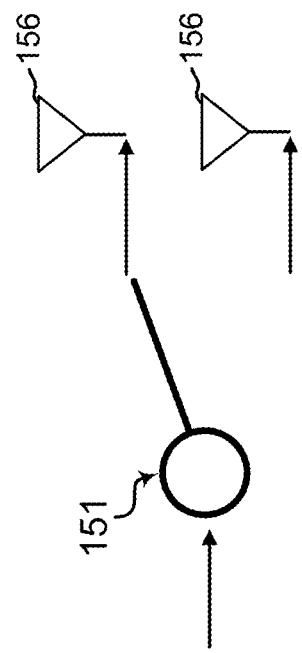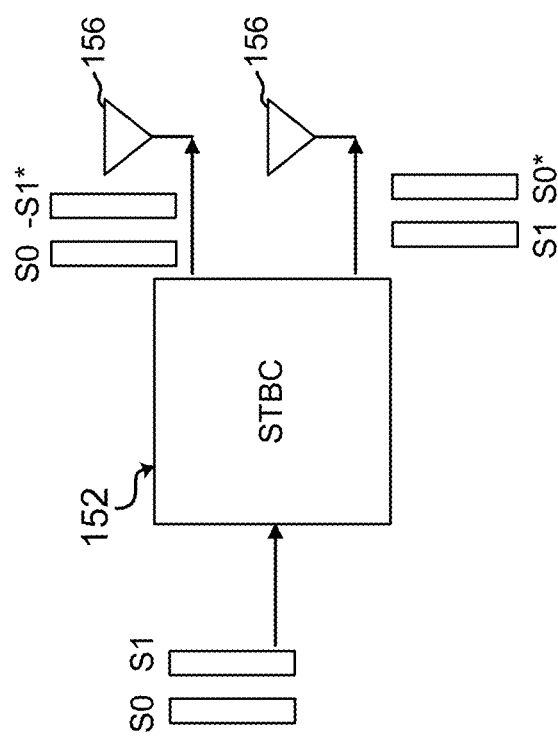

UPLINK TRANSMIT DIVERSITY AND PRECODING

This application is a Continuation of U.S. patent application Ser. No. 15/851,180, filed Dec. 21, 2017, which is a Continuation of U.S. patent application Ser. No. 15/834,687, filed Dec. 7, 2017, which claims priority to U.S. Provisional Application No. 62/432,390, titled "UPLINK TRANSMIT DIVERSITY AND PRECODING," filed Dec. 9, 2016, each of which is assigned to the assignee hereof, and incorporated herein by reference in its entirety.

BACKGROUND

Aspects of the present disclosure relate generally to wireless communication networks, and more particularly, to uplink transmissions using multiple antennas.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current uplink transmission solutions may not provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method of wireless communications including identifying, by a user equipment (UE) comprising multiple antennas, an uplink transmission of at least one stream as using one of cyclic prefix orthogonal frequency division multiplexing or discrete Fourier transform spread orthogonal frequency division multiplexing. The method may include applying, by the UE, a transmit diversity technique to the at least one identified stream, the transmit diversity technique being at least one of: antenna switching, space-time block coding, small delay cyclic delay diversity, space orthogonal resource transmit diversity, or precoding. The method may include transmitting, by the UE, the at least one identified stream from the multiple antennas according to the transmit diversity technique.

In another aspect, the disclosure provides a method of wireless communications for uplink transmissions. The method may include identifying, by a UE including at least two antennas, an uplink transmission of at least one stream as using one of cyclic prefix orthogonal frequency division multiplexing or discrete Fourier transform spread orthogonal frequency division multiplexing. The method may include applying, by the UE, a precoding matrix to the at least one identified stream. The precoding matrix may change over time. The method may include transmitting, by the UE, the at least one identified stream from the at least two antennas according to the applied precoding matrix.

In another aspect, the disclosure provides a UE including a memory, at least two antennas, a transceiver, and a processor in communication with the memory and the transceiver. The processor may be configured to identify an uplink transmission of at least one stream as using one of cyclic prefix orthogonal frequency division multiplexing or discrete Fourier transform spread orthogonal frequency division multiplexing. The processor may be configured to apply a precoding matrix to the at least one identified stream, wherein the precoding matrix changes over time. The processor may be configured to transmit the at least one identified stream from the at least two antennas according to the applied precoding matrix.

In another aspect, the disclosure provides a UE for wireless communications. The UE may include at least two antennas. The UE may include means for identifying an uplink transmission of at least one stream as using one of cyclic prefix orthogonal frequency division multiplexing or discrete Fourier transform spread orthogonal frequency division multiplexing. The UE may include means for applying, by the UE, a precoding matrix to the at least one identified stream, wherein the precoding matrix changes over time. The UE may include means for transmitting, by the UE, the at least one identified stream from the at least two antennas according to the applied precoding matrix.

In another aspect, the disclosure provides a computer-readable medium storing computer code executable by a processor for wireless communications. The computer-readable medium may include code to identify, by a UE comprising at least two antennas, an uplink transmission of at least one stream as using one of cyclic prefix orthogonal frequency division multiplexing or discrete Fourier transform spread orthogonal frequency division multiplexing. The computer-readable medium may include code to apply, by the UE, a precoding matrix to the at least one identified stream, wherein the precoding matrix changes over time. The computer-readable medium may include code to transmit, by the UE, the at least one identified stream from the at least two antennas according to the applied precoding matrix.

In another aspect, the disclosure provides a method of wireless communications for receiving uplink transmissions. A base station may receive an uplink transmission from a UE coded with a precoding matrix that varies according to a precoding cycling pattern. The base station may measure the received uplink transmission to determine a best precoding matrix of the precoding cycling pattern. The base station may indicate the best precoding matrix of the precoding cycling pattern to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 2 is a conceptual diagram illustrating an example of antenna switching.

FIG. 3 is a conceptual diagram illustrating an example of space-time block coding (STBC).

DETAILED DESCRIPTION

Figure 1:
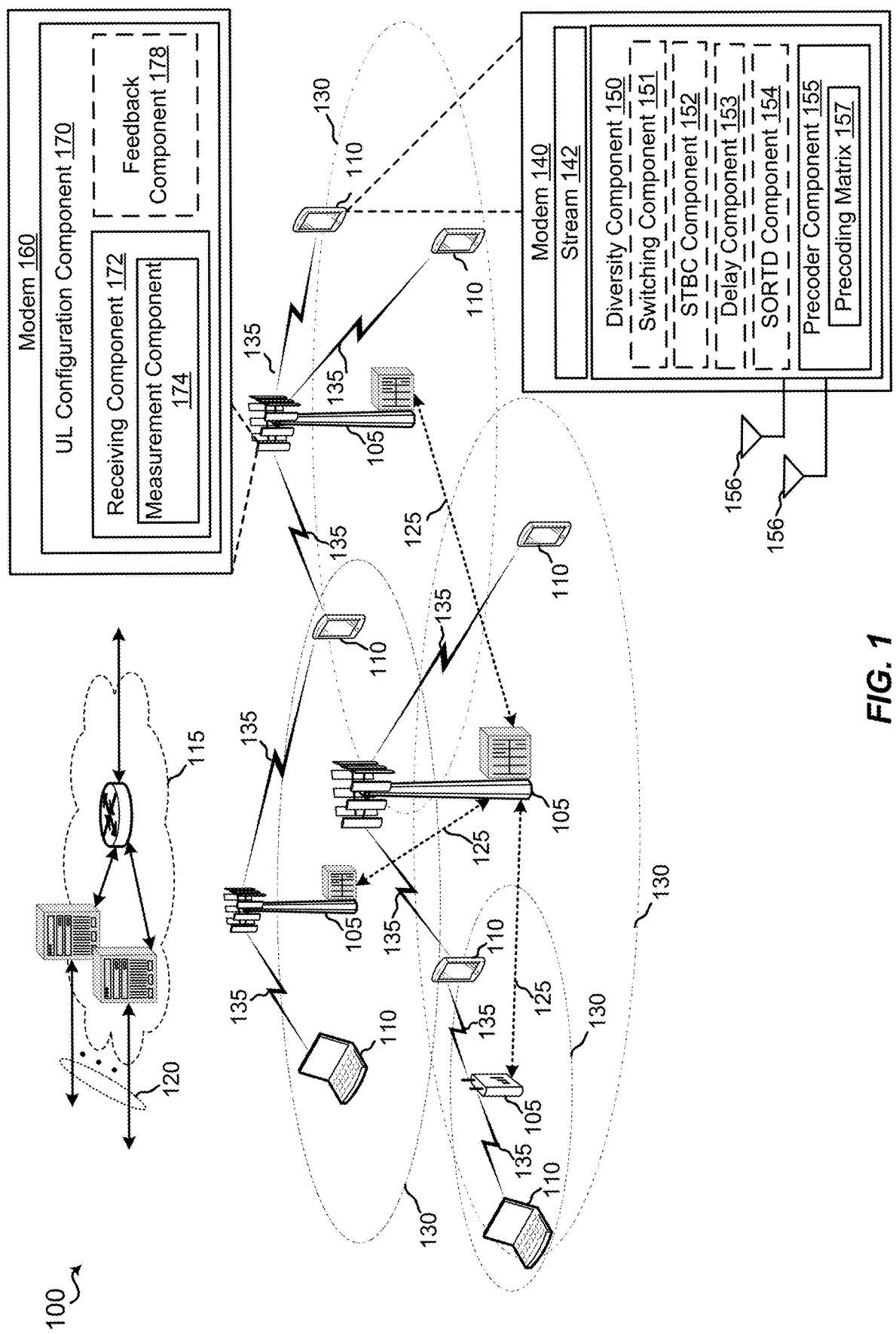
FIG. 1 is a schematic diagram of a wireless communication network including at least one user equipment (UE) having a transmission component configured according to this disclosure to transmit at least one uplink stream on multiple antennas.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to providing transmit diversity for uplink transmissions. In a 5G NR system, it is envisaged that UL transmissions will use either cyclic prefix orthogonal frequency division multiplexing (CP-OFDM), or discrete Fourier transform spread orthogonal frequency division multiplexing (DST-s-OFDM), which may also be referred to as single carrier OFDM (SC-OFDM). For DST-s-OFDM, single stream transmission may be used for uplink transmissions. Accordingly, even where a UE has multiple antennas, a multiple-input multiple-output (MIMO) precoder may not be used with DST-s-OFDM transmissions. Transmit diversity, however, may be used with DST-S-OFDM transmissions. Further, SC-OFDM transmissions may use either single or multiple stream transmissions. Accordingly, a MIMO precoder may be used with SC-OFDM and a UE may also use transmit diversity.

The present disclosure provides for various transmit diversity schemes that may be used within a 5G NR system. The transmit diversity schemes may use one or more of antenna switching, space time block codes (STBC), small delay cyclic delay diversity, space orthogonal resource transmit diversity (SORTD), or precoding to achieve transmit diversity.

Additional features of the present aspects are described in more detail below with respect to FIGS. 1-14.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a diversity component 150 that transmits at least one stream 142 from multiple antennas 156 according to a transmit diversity scheme. The diversity component 150 may identify an uplink transmission of at least one stream 142 as using one of cyclic prefix orthogonal frequency division multiplexing or discrete Fourier transform spread orthogonal frequency division multiplexing. The diversity component 150 may apply a transmit diversity technique to the at least one stream 142. The transmit diversity technique may include at least one of: antenna switching, space-time block coding, small delay cyclic delay diversity, space orthogonal resource transmit diversity, or precoding. The diversity component 150 may transmit the at least one stream 142 from multiple antennas 156 according to the transmit diversity technique. The diversity component 150 may thereby achieve transmit diversity for the at least one stream 142 and improve reception at a base station. Further, wireless communication network 100 includes at least one base station 105 with a modem 160 having a UL configuration component 170 that receives a transmission from the UE 110 according to a selected transmit diversity scheme. In some aspects, the UL configuration component may be aware of the UL transmit diversity scheme and decode the UL transmission based in part on the UL transmit diversity scheme. In another aspect, the UL configuration component may provide feedback to the UE to configure the UL transmit diversity scheme. Thus, according to the present disclosure, a UE may use UL transmit diversity to improve reception of UL transmissions in a 5G NR wireless communication network.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB, gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communication network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

The diversity component 150 may include various sub-components that implement different transmit diversity schemes. For example, the diversity component 150 may include a switching component 151, a STBC component 152, a delay component 153, a SORTD component 154, and/or a precoder component 155. The switching component 151 may select a single antenna 156 from a set of multiple antennas 156 to use at a certain time. The switching component 151 may change the selected antenna based on feedback from the base station 105 and/or a set switching pattern. The STBC component 152 may apply an STBC to one or more streams 142 to spread the one or more streams 142 among the set of multiple antennas 156. The STBC component 152 may provide full transmit diversity. The delay component 153 may transmit the same signal from multiple antennas 156 with a small delay added to the signal for one or more of the antennas 156. For example, the delay component 153 may a cyclic shift unit for adding the delay. The delay may simulate multi-path transmit diversity. The SORTD component 154 may select a set of tones for each antenna 156 from each symbol. Accordingly, the SORTD component 154 may transmit different sets of tones from each of the multiple antennas 156. The precoder component 155 may apply either a MIMO or single input multiple-output (SIMO) precoder to one or more streams 142 to spread the one or more streams 142 among the set of multiple antennas 156. For example, the precoder component 155 may select a precoding matrix 157 to apply to the one or more streams 142. As discussed in further detail below, the precoder component 155 may select the precoding matrix 157 using closed loop feedback, open loop cycling, or a combination of open loop cycling and closed loop feedback.

The UL configuration component 170 may determine a configuration of an uplink transmission from the UE 110. In an aspect, the UL configuration component 170 may provide the UE 110 with a selected transmit diversity scheme. The UL configuration component 170 may include a receiving component 172 and a feedback component 178. The receiving component 172 may use the selected transmit diversity scheme to assist in receiving or decoding a received signal. The receiving component 172 may also include a measurement component 174 that may provide measurements for specific antenna or precoders according to the transmit diversity scheme. For example, the measurement component 174 may measure a per symbol or per subframe signal to noise ratio (SNR) or channel estimate, which may be used to select a desired antenna or precoder. The feedback component 178 may provide information to the UE 110 for use in selecting a transmit diversity scheme and/or a specific antenna or precoder. The feedback component 178 may provide a selection made by the base station 105, or may provide measurement information for the UE 110 to use in making a selection.

Referring to FIG. 2, a conceptual diagram 200 illustrates an antenna switching transmit diversity scheme that may include use of only a single antenna at any particular time. The switching component 151 may select an antenna 156 to use for a certain time period and switch the selected antenna 156 over time. For example, the switching component 151 may select an antenna 156 on a subframe, slot, or symbol basis.

In an aspect, antennas switching may use a closed loop switching scheme. The UL configuration component 170 at the base station 105 may select a best antenna 156 and provide feedback to the UE 110. For example, measurement component 174 may measure a signal-to-noise ratio (SNR) for a selected antenna 156. The feedback component 178 may then select the antenna 156 that provides the best SNR and provide an indication to the UE 110 to use the selected antenna 156. A closed loop antenna switching scheme may also be referred as antenna selection. A closed loop switching scheme may operate on a subframe basis. For example, the feedback mechanism may be bound by a round trip time. The closed loop switching scheme may be beneficial for UEs having relatively stable channel conditions (e.g., low Doppler effects).

In another aspect, antenna switching may use an open loop switching scheme. In an open loop switching scheme, the UE 110 may not know which antenna is best, but may change antennas to attempt to average performance. The switching component 151 may switch the selected antenna from time to time based on a fixed pattern. In a subframe based pattern, only one antenna is used per subframe, and the antenna switching may occur from subframe to subframe. Only one demodulation reference signal (DMRS) antenna port may be used per subframe in a subframe based pattern. In a symbol based pattern one antenna may be used per symbol, and antenna switching may occur from symbol to symbol. Multiple DMRS antenna ports may be used per subframe for channel estimation. To reduce overhead, a symbol based pattern may use cyclic shifts or different tones to transmit the DMRS for multiple antennas in the same symbol. A symbol based pattern may be beneficial to high Doppler UEs.

In another aspect, antenna switching may change between an open loop switching scheme and a closed loop switching scheme. The switching scheme may start with open loop switching (either subframe or symbol based). Once the base station 105 has gathered data based on the various open loop configuration, the UL configuration component 170 may determine which antenna is better based on the received signals. If open loop switching is subframe based, the UL configuration component 170 may select an antenna 156 based on decoding results and/or channel/SNR estimation. If open loop switching is symbol based, the UL configuration component 170 may select an antenna 165 based on channel estimation and SNR estimation per antenna. The feedback component 178 may indicate the selected antenna 156 to the UE 110, and the UE 110 may change to the closed loop switching scheme starting with the selected antenna 156.

Referring to FIG. 3, a conceptual diagram 300 illustrates a transmission path using a space time block code (STBC). In an STBC transmit diversity scheme, the STBC component 152 may spread one or more streams 142 for multiple antennas to transmit simultaneously using a fixed STBC. Accordingly, an STBC transmit diversity scheme may be open loop only, and no feedback may be needed. In an aspect, a fixed STBC may be selected that provides full diversity among the available antennas. For example, an Alamouti code may be used for two antennas. In an aspect, the STBC may not be fixed and an STBC may be selected based on currently available antennas and input streams or symbols. For multiple stream transmissions, each stream may be fed to a respective input of the STBC. For single stream transmissions, adjacent OFDM symbols may be transmitted with STBC. For example, a first symbol may be assigned to the S0 input of the STBC and the following symbol may be assigned to the S1 input of the STBC. If the size of the STBC is fixed, pairing of symbols may not be available if the number of symbols is not a multiple of the number of antennas. In such a case, the remaining unpaired symbols may use antenna switching, a lower dimension STBC, or another single symbol diversity scheme. For example, if the number of OFDM symbols is 11, and the number of Tx antennas is 2, there will be 1 remaining symbol. For the last remaining OFDM symbol, antenna switching may be used to select either antenna 1 or antenna 2 to transmit the remaining symbol. In another aspect, a symbol may be split, for example, by scaling an OFDM numerology to increase the sub-carrier spacing and reduce the symbol period. The resulting symbols may, for example, have half of the symbol period and may be treated as paired adjacent OFDM symbols. The STBC may then be applied to the split symbols.

In an aspect, the following formulas may be used to apply a STBC defined by a matrix H:

$$y = Hs + n \quad (1)$$

$$\begin{bmatrix} y_0 \\ y_1* \end{bmatrix} = \frac{1}{\sqrt{2}} \begin{bmatrix} h_{00} & -h_{01} \\ h_{11}* & h_{10}* \end{bmatrix} \begin{bmatrix} S_0 \\ S_1* \end{bmatrix} + \begin{bmatrix} n_0 \\ n_1* \end{bmatrix} \quad (2)$$

The component y may be the input to the antenna, the component S may be a desired signal, and the component n may be noise.

Further, STBC techniques may be combined with other transmit diversity techniques disclosed herein. For example, STBC techniques may be used with antenna selection. A subset of antennas may be selected from the total number of Tx antennas. The open loop and closed loop techniques discussed above for antenna switching may be used to select the subset of antennas. For example, If there is a total of four Tx antennas, either the UE 110 or the base station 105 may select two of the antennas to use for STBC. The STBC outputs may then be applied to the two selected antennas. The design may be considered closed loop antennas selection if the base station 105 selects the subset of antennas and sends the selection to the UE 110. The design may be considered open loop antenna selection if the UE 110 selects the subset of antennas. One particular application may be in a massive MIMO device having a large number of potential physical antennas (e.g., 16) but a fixed number of logical antennas (e.g., 4). Antenna selection may be used to select the best physical antennas, while STBC may be used to provide full diversity.

Figure 4:
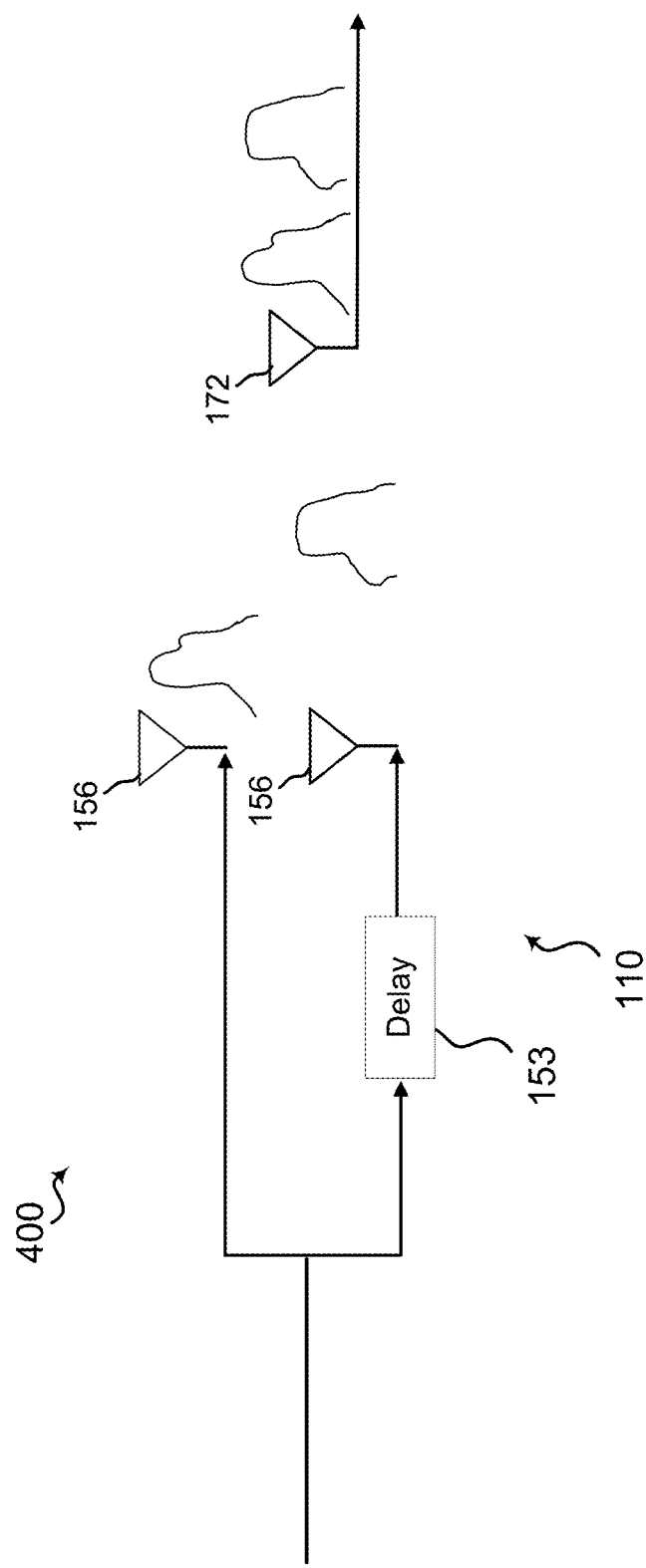
FIG. 4 is a conceptual diagram illustrating an example of small delay cyclic delay diversity.

Referring to FIG. 4, a conceptual diagram 400 illustrates an example transmission path using small delay cyclic delay diversity (CDD). The delay component 153 may apply a small delay on the transmission path to one or more of the antennas. For example, the delay component 153 may be a cyclic shift unit. Accordingly, the small delay CDD may simulate multi-path diversity. The added delay may be equivalent to an increased delay spread due to multi-path diversity. The same signal transmitted by each antenna may be separated in time. The small delay CDD transmit diversity scheme may be transparent at the base station side. For example, the base station 105 may receive the signal and attempt the combine the multiple copies of the signal in the same manner as the base station 105 processes multi-path signals. Further, performance may be sensitive to applied delays. If the delay is too small, transmitting from multiple antennas may result in interference between the antennas. If the delay is too large, the received signals may be out of a receive window at the base station. A maximum error vector magnitude (EVM) may be defined to limit the delay at the UE.

Figure 5:
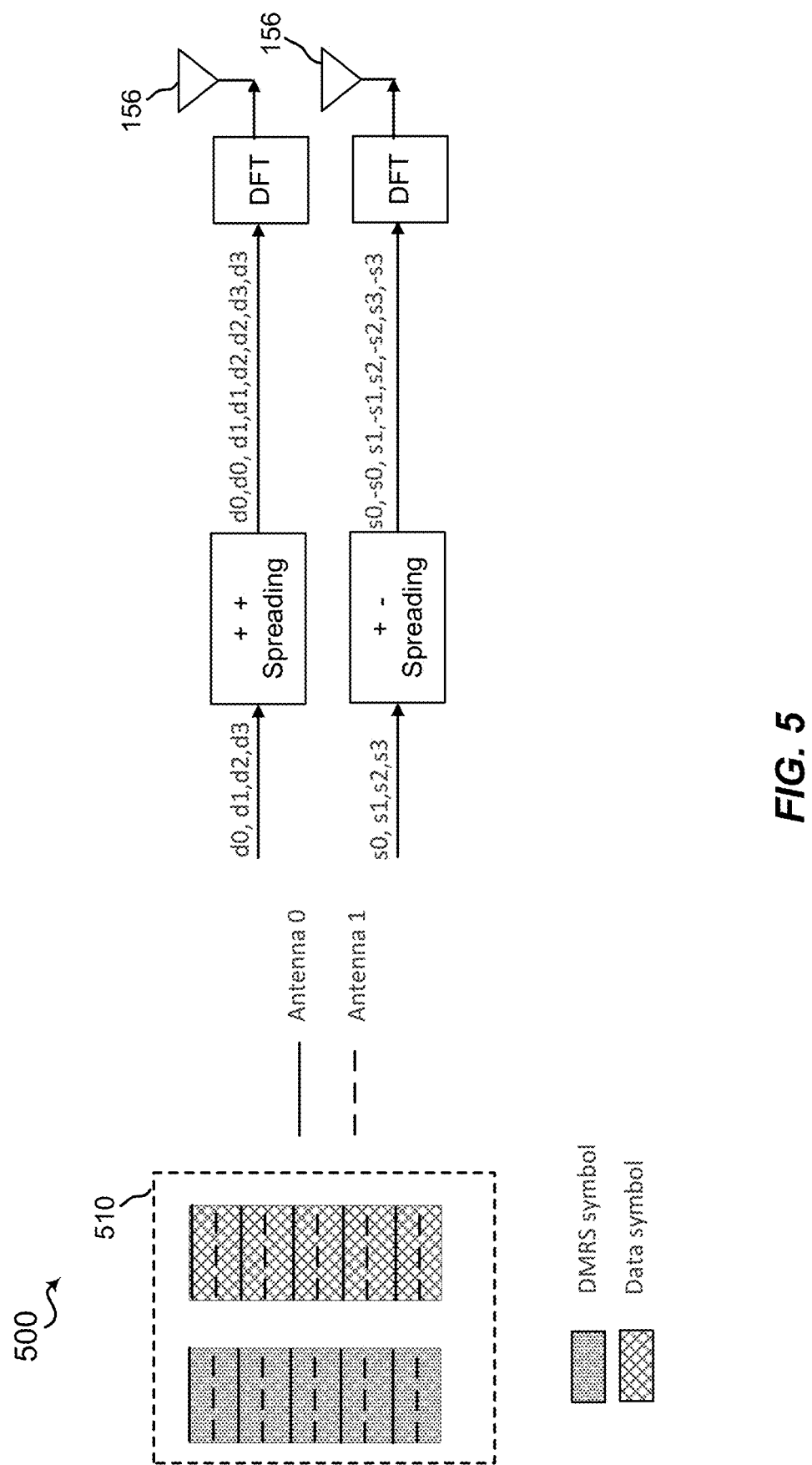
FIG. 5 is a conceptual diagram illustrating an example of space orthogonal resource transmit diversity (SORTD).

Referring to FIG. 5, a conceptual diagram 500 illustrates separation of symbols to multiple antennas using combs in an example of space orthogonal resource transmit diversity (SORTD). A comb may be a set of frequencies or tones that are about evenly spaced from each other. The SORTD component 154 may include a comb component 510 that uses a comb to select a set of tones of a symbol for each antenna. The comb for each antenna may select different tones. For example the selected tones may be interleaved. The combs may select tones for both DMRS symbols and data symbols. Accordingly, a comb based transmit diversity scheme may provide a simple implementation for transmit diversity. Conceptually, comb based transmit diversity may be similar to antenna switching, except the selection for each antenna occurs in the frequency domain rather than the time domain. In an aspect, however, comb based transmit diversity may perform worse than STBC due to lack of diversity on modulated symbols per tone.

In an aspect, comb based multi-antenna transmission may be considered a special case of SORTD. In an aspect, another technique is to assign the one or more streams or comb outputs to multiple antennas and perform code division spreading before the discrete Fourier transform (DFT). The data fed to each code may be different (e.g., different streams) or the same. If the data is the same, the transmission achieves full diversity. If the data is different, the gain is equal to the coding gain. In an aspect, this technique may be theoretically similar to transmission of the physical uplink common control channel (PUCCH) format 5 in LTE except here the different codes are used to separate antennas instead of users.

Figure 6:
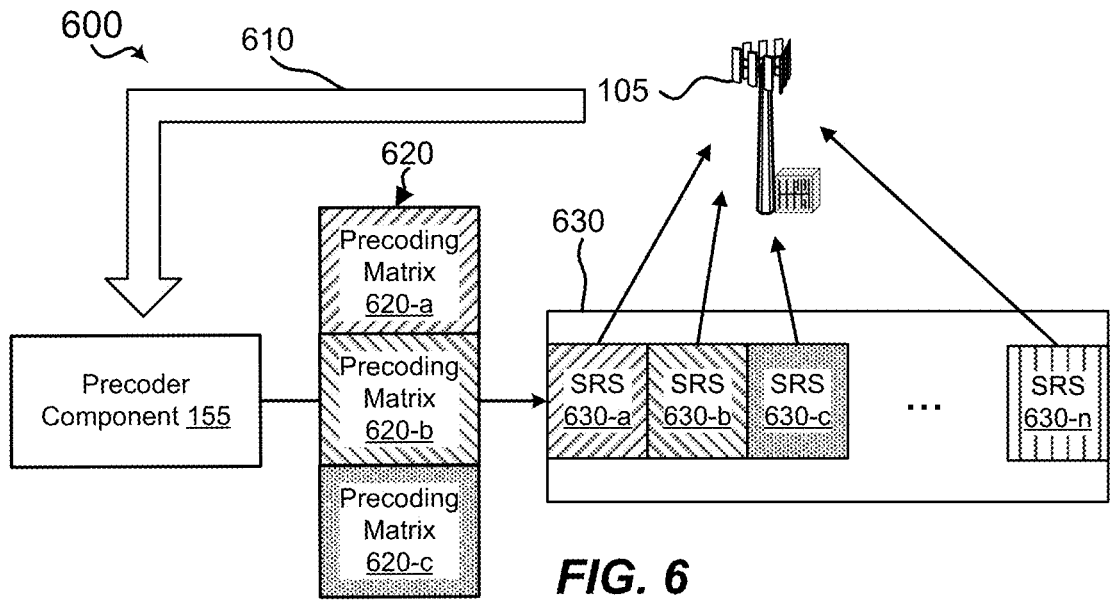
FIG. 6 is a conceptual diagram illustrating an example of sounding reference signal (SRS) precoding.

Referring to FIG. 6, a conceptual diagram 600 illustrates an example of uplink MIMO precoding. The precoder component 155 may use closed loop precoding, open loop precoding, or switching between open loop and closed loop precoding. In closed loop precoding, the base station 105 may select a precoding matrix 620 based on channel estimation and correlation matrix at the base station 105. The base station 105 may calculate the precoding matrix 620 and provide an indication 610 of the calculated matrix to the UE 110, or the base station may send the correlation matrix and/or channel estimation to the UE 110 to select the precoding matrix 620.

In an aspect, the precoder component 155 may also apply the precoding matrix 620 to a sounding reference signal (SRS) 630. For example, multiple SRS transmissions with a pre-set precoding cycling pattern may be used. The cycling pattern may be symbol based using multiple precoded-SRS symbols per subframe. For example, each of the precoded SRS blocks 630-$a$-630-$n$ in FIG. 6 may represent a symbol. In another aspect, the cycling pattern may be subframe based using one precoded SRS symbol per subframe. Each of the precoded SRS blocks 630-$a$-630-$n$ in FIG. 6 may represent a subframe. The base station 105 may measure the precoded SRS 630 transmissions and select one precoding matrix 620. The feedback component 178 at the base station 105 may send an indication 610 of the selected precoding matrix 620 to the UE 110. In an aspect, an SRS 630 precoded with a MIMO precoding matrix will not be single carrier even if the non-precoded SRS sequence is single carrier. Accordingly, in an aspect, a MIMO precoder may be used only with an SC-OFDM transmission.

Additionally, the SRS design may be applied to a physical uplink common control channel (PUCCH). In contrast, in LTE, SRS is used only for physical uplink shared channel (PUSCH). However, transmit diversity or precoding may be beneficial for PUCCH as well. PUCCH may have a different transmit diversity scheme than PUSCH. For example, PUCCH may use two Tx antennas with STBC while PUSCH may use four Tx antennas using precoding. If the SRS is precoded, the SRS for PUCCH may be different than the SRS for PUSCH if the number of Tx antennas is different. That is, the precoder may be different if the SRS is precoded. Transmitting different SRS using different precoders may increase the overhead for SRS. If the SRS is not precoded, the same SRS transmission may be reused for receiving both the PUCCH and the PUSCH.

Figure 7:
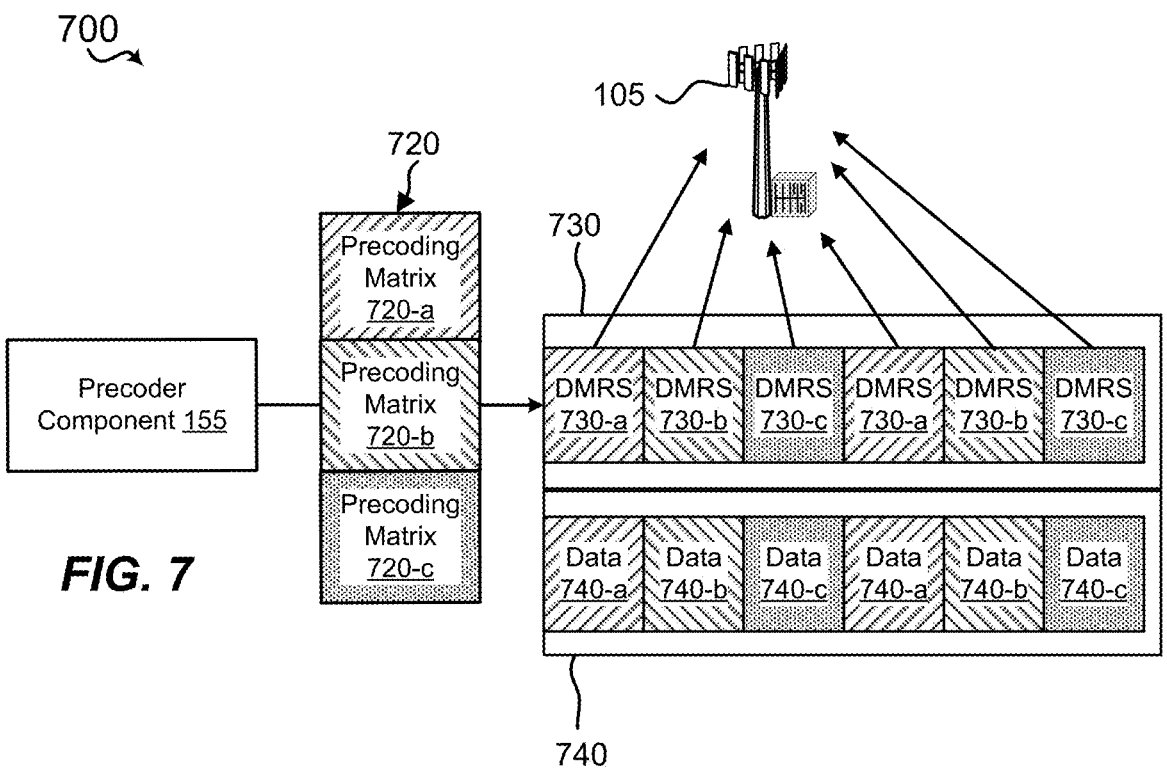
FIG. 7 is a conceptual diagram illustrating an example of open loop data precoding.

Referring to FIG. 7, a conceptual diagram 700 illustrates an example of open loop precoding cycling. The precoder component 155 may enumerate different precoding matrices 720-$a$-720-$c$ at the UE side with a fixed pattern. For example, in a subframe based precoding pattern, DMRS 730 may be precoded the same way as data 740. The precoding may be transparent at the base station 105. Using a symbol based precoding cycling pattern, data symbols 740-*a*-740-*c* may each use a different precoding matrix. Either the DMRS 730 is non-precoded or one precoded DMRS symbol 730-*a*-730-*b* per precoding matrix 720-*a*-720-*c* is used. Using a non-precoded DMRS may reduce overhead, but an SINR estimate based on a non-precoded DMRS may not align with the symbols precoded by applying precoding matrix 720. If one precoded DMRS symbol 730 is used per precoding matrix 720, an SINR estimate may be available for each precoding matrix, but the overhead for DMRS may be increased.

Figure 8:
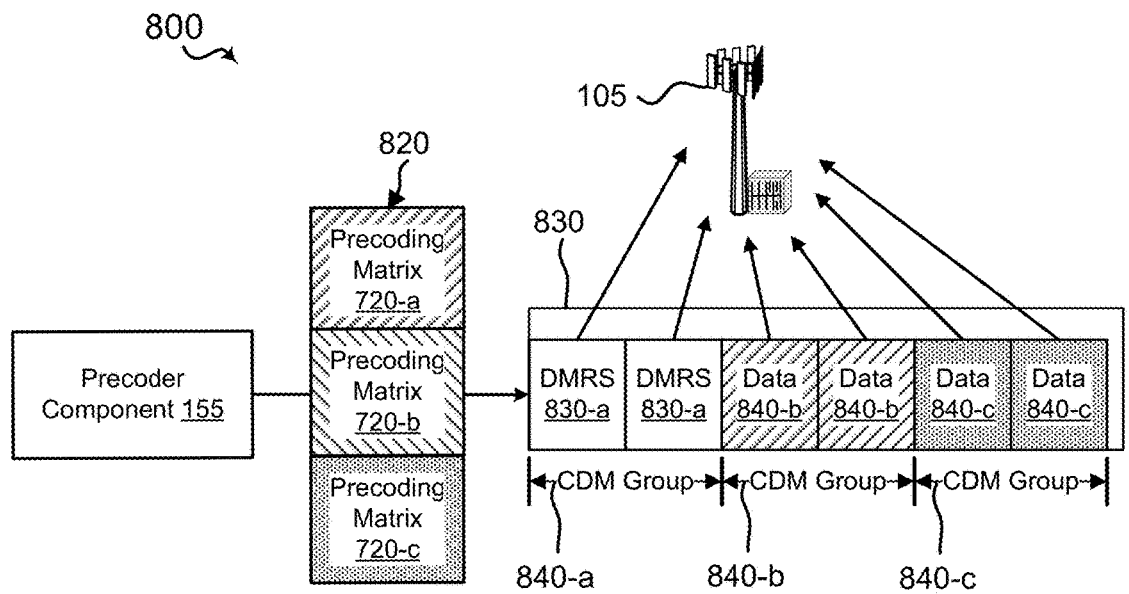
FIG. 8 is a conceptual diagram illustrating an example of open loop data precoding using code division multiplexing (CDM) groups.

Referring to FIG. 8, a conceptual diagram 800 illustrates an example of precoding cycling with code division multiplexing (CDM) grouping. In an aspect, multiple UEs may share an uplink channel using CDM. For example, each UE or group of UEs may apply a Walsh code to the UL transmission. The precoder component 155 may vary the precoding matrix 820 (e.g., from CDM group 840-*a* to CDM group 840-*b*). Using the same precoding matrix 820 within a CDM group 840 may keep the CDM codes orthogonal. A DMRS 830 may be transmitted without precoding by each UE within each CDM group.

Additionally switching from open loop to closed loop precoding may be used. The precoder component 155 may start with open loop precoding cycling (either subframe or symbol based). The base station 105 may determine which precoder is better based on the received signal. If open loop precoding cycling is subframe based, the base station 105 may select a precoding matrix based on decoding results and/or channel/SNR estimation. If the open loop precoding cycling is symbol based, the base station 105 may estimate precoded quality with data aided channel and SNR estimation after decoding. For example, the base station 105 may re-encode successfully decoded data to estimate the SNR. Such a solution may have high complexity and may not be applicable if decoding fails. In any case, when the base station 105 determines a best precoder, the feedback component 178 at base station 105 may send the selected precoder to the UE 110. Switching from closed loop to open loop precoding may also occur. For example, if channel conditions change and/or the UE 110 does not receive feedback from the base station 105, the UE 110 may revert to open loop precoding until the base station 105 resumes the closed loop feedback.

Figure 9:
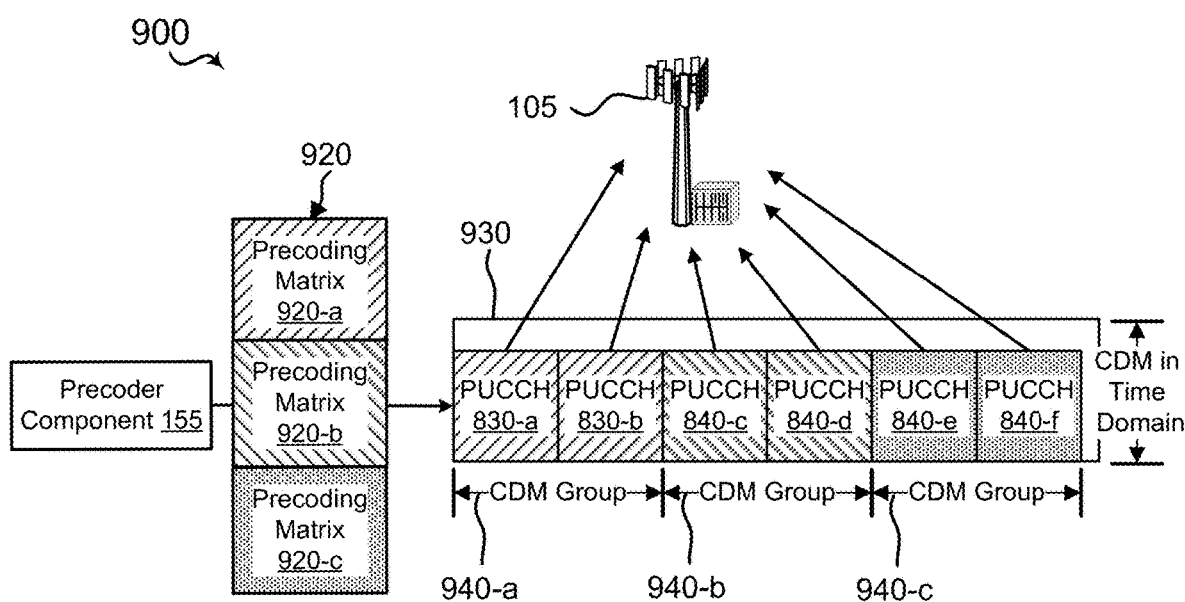
FIG. 9 is a conceptual diagram illustrating an example of precoding cycling with CDM grouping for a physical uplink common control channel.

Referring to FIG. 9, a conceptual diagram 900 illustrates an example of precoding cycling with CDM grouping for PUCCH. CDM may be used in the frequency domain (e.g., cyclic shifts) for PUSCH to maintain the DMRS overhead and support multi-antenna ports. The same approach may not be applicable to PUCCH 930 when CDM in the frequency domain is already used in PUCCH design. For example, the LTE PUCCH ACK format 1A/1B may have six (6) users multiplexed in the frequency domain (e.g., CDM Groups 940) and three (3) users multiplexed in the time domain. Accordingly, there may be no additional resource (e.g., code) to add multiple antenna ports. In an aspect, non-coherent transmission may be used in such cases because a DMRS may not be needed for non-coherent transmission. Accordingly, each CDM group 940 may change antenna or precoding arbitrarily (e.g., by changing precoding matrix 920) and the base station 105 may be able to receive the non-coherent transmission.

Figure 10:
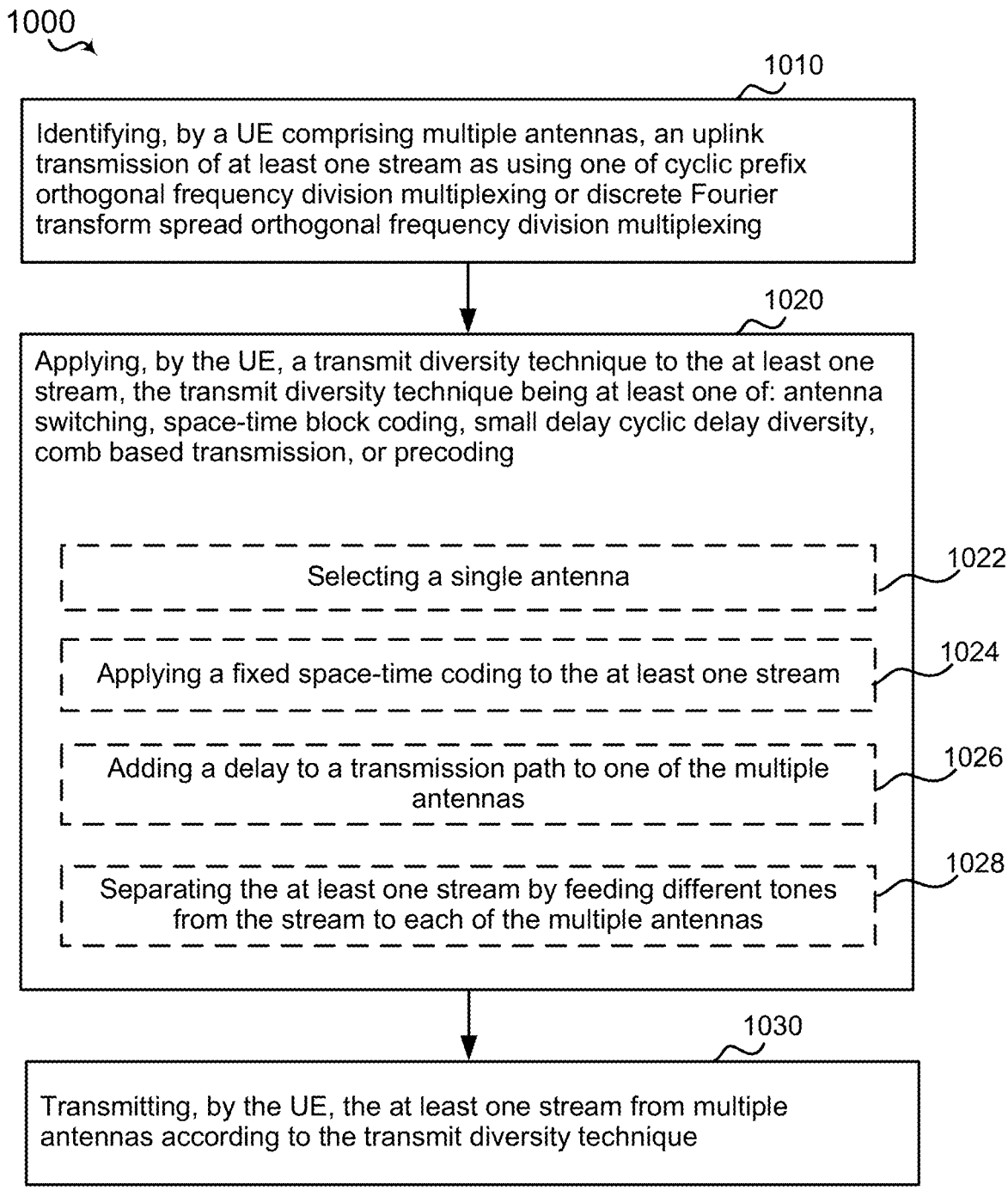
FIG. 10 is a flow diagram of an example of a method of uplink transmission using transmit diversity.

Referring to FIG. 10, for example, a method 1000 of wireless communication in operating a UE 110 according to the above-described aspects to transmit at least one stream from multiple antennas includes one or more of the herein-defined actions.

For example, at 1010, method 1000 includes identifying, by a UE comprising multiple antennas, an uplink transmission of at least one stream as using one of cyclic prefix orthogonal frequency division multiplexing or discrete Fourier transform spread orthogonal frequency division multiplexing. For instance, in an aspect, the UE 110 may execute diversity component 150 to identify the uplink transmission of the at least one stream as using one of cyclic prefix orthogonal frequency division multiplexing or discrete Fourier transform spread orthogonal frequency division multiplexing, as described herein.

At 1020, the method 1000 includes applying, by the UE, a transmit diversity technique to the at least one stream, the transmit diversity technique being at least one of: antenna switching, space-time block coding, small delay cyclic delay diversity, comb based transmission, or precoding. In an aspect, for instance, the UE 110 may execute the diversity component 150 or one of the subcomponents thereof to apply a transmit diversity technique to the at least one stream. For example, at 1022 the switching component 151 may optionally apply antenna switching and select a single antenna. As another example, at 1024 the STBC component 152 may optionally apply space-time block coding and applying a fixed space-time coding to the at least one stream. As another example, at 1026 the delay component 153 may optionally apply small delay CDD and add a delay to a transmission path to one of the multiple antennas 156. As another example, at 1028 the comb component 510 may optionally apply comb based transmission and separate the at least one stream by feeding different tones from the stream to each of the multiple antennas 156. Further, the transmit diversity techniques described herein may be used in combination with the precoding techniques described herein. For example, the action 1020 may be used in combination with the method 1100 discussed below with respect to FIG. 11.

At 1030, the method 1000 includes transmitting, by the UE, the at least one stream from the multiple antennas according to the transmit diversity technique. In an aspect, for example, the diversity component 150 may transmit the at least one stream from multiple antennas 156 according to the transmit diversity technique.

Figure 11:
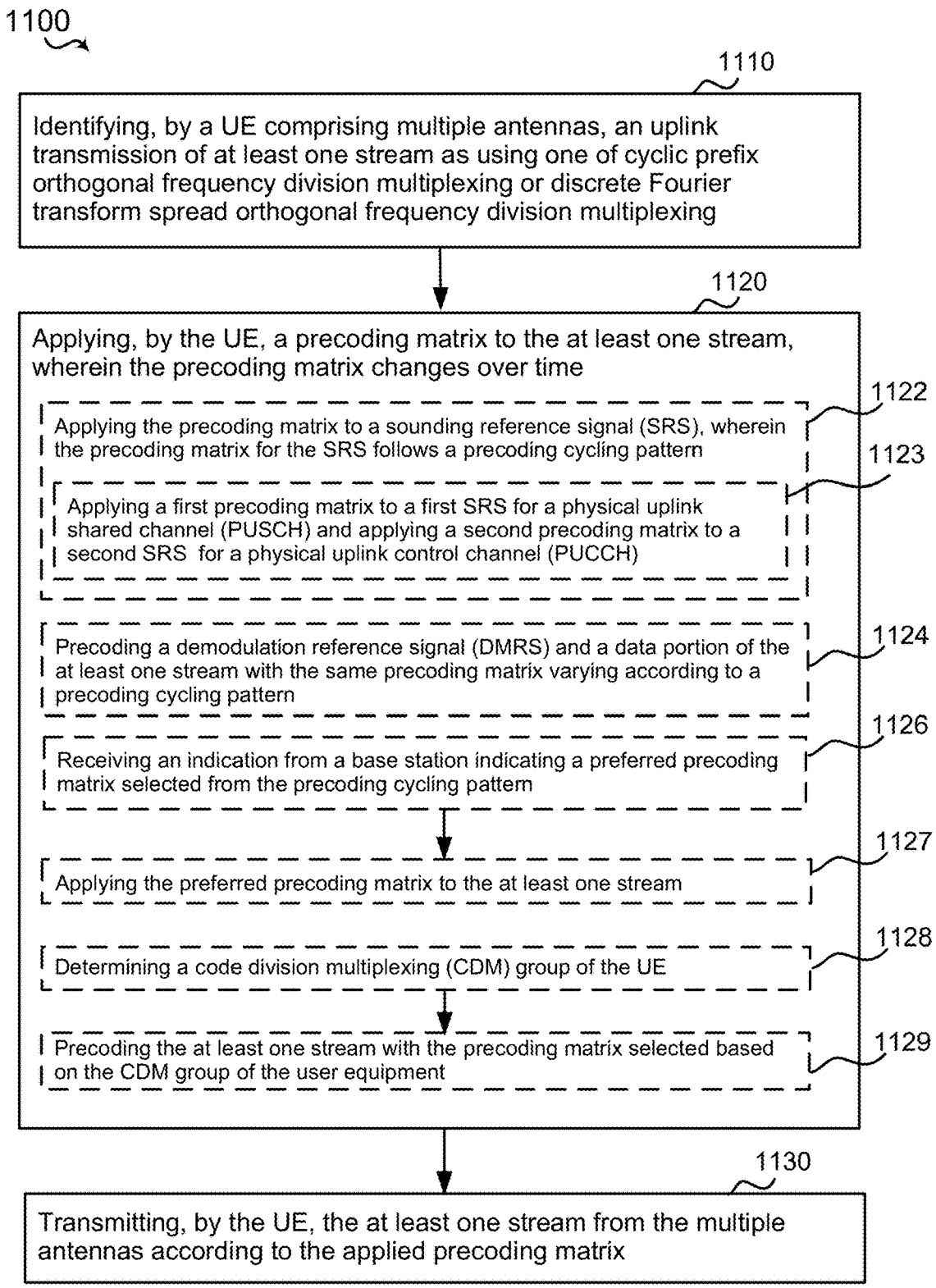
FIG. 11 is a flow diagram of an example of a method of uplink transmission using precoding.

Referring to FIG. 11, for example, a method 1100 of wireless communication in operating UE 110 according to the above-described aspects to transmit at least one stream from multiple antennas includes one or more of the herein-defined actions.

For example, at 1110, method 1100 includes identifying, by a UE comprising multiple antennas, an uplink transmission of at least one stream as using one of cyclic prefix orthogonal frequency division multiplexing or discrete Fourier transform spread orthogonal frequency division multiplexing. For instance, in an aspect, the UE 110 may execute the diversity component 150 to identify the uplink transmission of the at least one stream as using one of cyclic prefix orthogonal frequency division multiplexing or discrete Fourier transform spread orthogonal frequency division multiplexing, as described herein.

At 1120, the method 1000 includes applying, by the UE, a precoding matrix to the at least one stream, wherein the precoding matrix changes over time. In an aspect, for instance, the UE 110 may execute the precoder component 155 or one of the subcomponents thereof to apply a precoding matrix 157 to the stream 142. The precoding matrix 157 may change over time.

For example, at 1122, the action 1120 may optionally include applying the precoding matrix to a sounding reference signal (SRS), wherein the precoding matrix for the SRS follows a precoding cycling pattern. For example, as illustrated in FIG. 6, the precoder component 155 may apply the precoding matrix 620 to the SRS 630. The precoding matrix 620 may follow a precoding cycling pattern such that, for example, SRS block 630-*a* uses different precoding than SRS block 630-*b*. The precoding cycling pattern may change on a symbol basis or a subframe basis. Further, at 1123, the action 1122 may include applying a first precoding matrix to a first SRS for a physical uplink shared channel (PUSCH) and applying a second precoding matrix to a second SRS for a physical uplink control channel (PUCCH). In this example, the PUSCH and the PUCCH may be considered different streams 142 and a different precoding matrix may be applied to each stream 142. Each precoding matrix may follow a precoding cycling pattern, which may be the same for both streams 142, or different.

As another example of changing the precoding matrix 157 over time, at 1124, the action 1120 may optionally include precoding a demodulation reference signal (DMRS) and a data portion of the at least one stream with the same precoding matrix varying according to a precoding cycling pattern. For example, as illustrated in FIG. 7, both the DMRS 730 and the data 740 may be precoded with the same precoding matrix 720 and follow the same precoding cycling pattern. Accordingly, the base station 105 may use the DMRS 730 to demodulate the data 740.

In an aspect, the changing precoding matrix may be based on closed loop feedback. For example, at 1126, the action 1120 may optionally include receiving an indication from a base station indicating a preferred precoding matrix selected from the precoding cycling pattern. For example, as illustrated in FIG. 6, the base station 105 may provide the indication 610 indicating a preferred precoding matrix selected from the precoding cycling pattern. At 1127, in response to receiving the preferred precoding matrix, the action 1120 may optionally include applying the preferred precoding matrix to the at least one stream. In an aspect, for example, the precoder component 155 may apply a preferred precoding matrix (e.g., precoding matrix 620-*b*) to the stream 142. The precoder component 155 may also apply the preferred precoding matrix to the SRS 630. That is, the precoder component 155 apply the preferred precoding matrix to the at least one identified stream without the precoding cycling pattern.

As another example of changing the precoding matrix 157 over time, at 1128 the action 1120 may optionally include determining a CDM group of the UE. For example, as illustrated in FIG. 8, the precoder component 155 may determine a CDM group 840 of the UE 110. The precoder component 155 may then select a precoding matrix 820 based on the CDM group. At 1129, in response to determining the CDM group of the UE, the action 1120 may optionally include precoding the at least one stream with the precoding matrix selected based on the CDM group of the user equipment. For example, the precoder component 155 may precode the stream 142 with the precoding matrix 820 selected based on the CDM group 840. By selecting the precoding matrix 820 based on the CDM group, the transmissions from different UEs in the CDM group 840 may be kept orthogonal.

At 1130, the method 1000 includes transmitting, by the UE, the at least one stream from the multiple antennas according to the applied precoding matrix. In an aspect, for example, the diversity component 150 may transmit the at least one stream 142 from multiple antennas 156 according to the applied precoding matrix 157.

Figure 12:
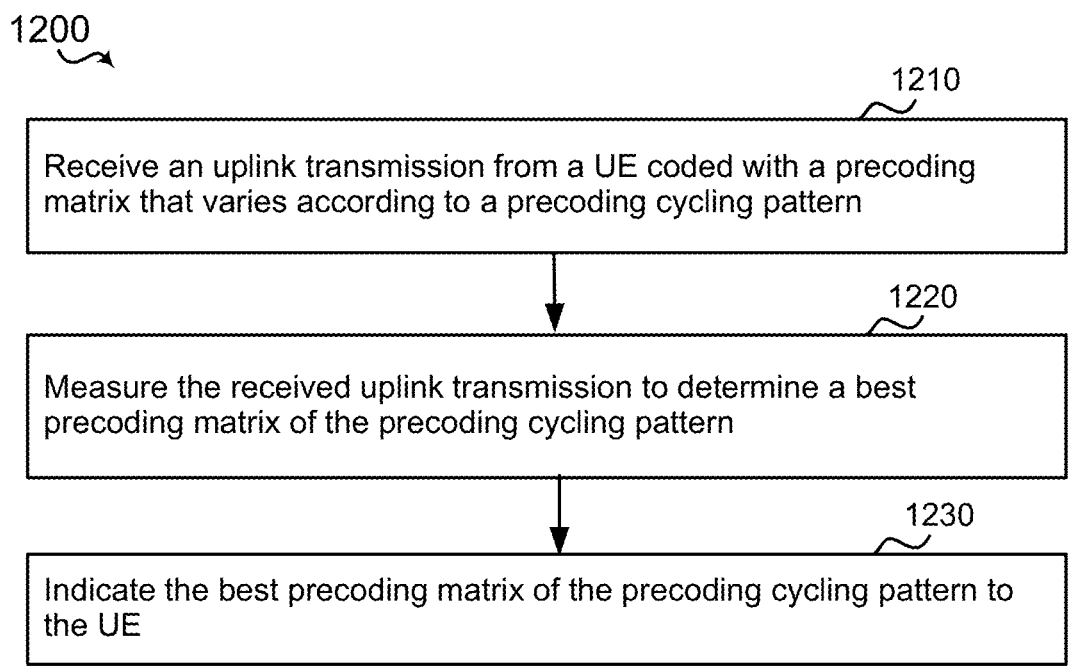
FIG. 12 is a flow diagram of an example of a method of base station operation for uplink transmission using precoding.

Referring to FIG. 12, for example, a method 1200 of wireless communication in operating a base station 105 according to the above-described aspects to facilitate uplink transmission using precoding includes one or more of the herein-defined actions.

For example, at 1210, method 1200 includes receiving an uplink transmission from a UE coded with a precoding matrix that varies according to a precoding cycling pattern. For instance, in an aspect, the base station 105 may execute the receiving component 172 to receive an uplink transmission from a UE 110 coded with a precoding matrix 620 that varies according to a precoding cycling pattern, as described herein.

At 1220, the method 1200 includes measuring the received uplink transmission to determine a best precoding matrix of the precoding cycling pattern. In an aspect, for instance, the base station 105 may execute the measurement component 174 to measure the received uplink transmission to determine a best precoding matrix (e.g., 620-*b*) of the precoding cycling pattern. For example, the measurement component 174 may measure a per symbol or per subframe SNR or channel estimate.

At 1230, the method 1200 includes indicating the best precoding matrix of the precoding cycling pattern to the UE. In an aspect, for example, the base station 105 may execute the feedback component 176 to indicate the best precoding matrix (e.g., 620-*b*) of the precoding cycling pattern to the UE 110. For example, the base station 105 may transmit the indication 610.

Figure 13:
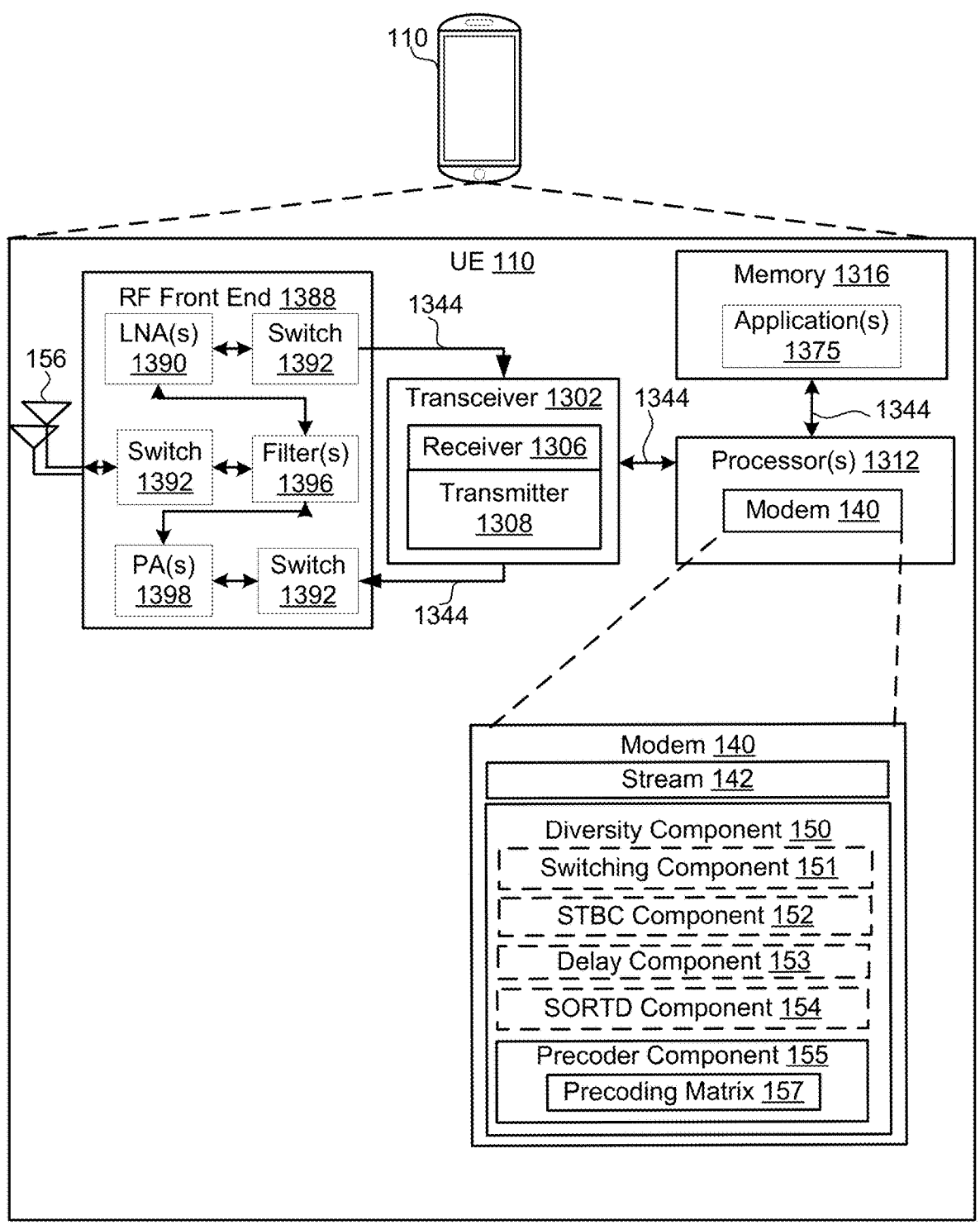
FIG. 13 is a schematic diagram of example components of the UE of FIG. 1.

Referring to FIG. 13 one example of an implementation of UE 110 may include a variety of components, some of which have already been described above, but including components such as one or more processors 1312 and memory 1316 and transceiver 1302 in communication via one or more buses 1344, which may operate in conjunction with modem 140 and diversity component 150 to enable one or more of the functions described herein related to uplink transmit diversity. Further, the one or more processors 1312, modem 1314, memory 1316, transceiver 1302, RF front end 1388 and one or more antennas 156, may be configured to support voice and/or data calls (simultaneously or non-simultaneously) in one or more radio access technologies.

In an aspect, the one or more processors 1312 can include a modem 1314 that uses one or more modem processors. The various functions related to diversity component 150 may be included in modem 140 and/or processors 1312 and, in an aspect, can be executed by a single processor, while in other aspects, different ones of the functions may be executed by a combination of two or more different processors. For example, in an aspect, the one or more processors 1312 may include any one or any combination of a modem processor, or a baseband processor, or a digital signal processor, or a transmit processor, or a receiver processor, or a transceiver processor associated with transceiver 1302. In other aspects, some of the features of the one or more processors 1312 and/or modem 140 associated with diversity component 150 may be performed by transceiver 1302.

Also, memory 1316 may be configured to store data used herein and/or local versions of applications 1375 or diversity component 150 and/or one or more of its subcomponents being executed by at least one processor 1312. Memory 1316 can include any type of computer-readable medium usable by a computer or at least one processor 1312, such as random access memory (RAM), read only memory (ROM), tapes, magnetic discs, optical discs, volatile memory, nonvolatile memory, and any combination thereof. In an aspect, for example, memory 1316 may be a non-transitory computer-readable storage medium that stores one or more computer-executable codes defining diversity component 150 and/or one or more of its subcomponents, and/or data associated therewith, when UE 110 is operating at least one processor 1312 to execute diversity component 150 and/or one or more of its subcomponents.

Transceiver 1302 may include at least one receiver 1306 and at least one transmitter 1308. Receiver 1306 may include hardware, firmware, and/or software code executable by a processor for receiving data, the code comprising instructions and being stored in a memory (e.g., computer-readable medium). Receiver 1306 may be, for example, a radio frequency (RF) receiver. In an aspect, receiver 1306 may receive signals transmitted by at least one base station 105. Additionally, receiver 1306 may process such received signals, and also may obtain measurements of the signals, such as, but not limited to, Ec/Io, SNR, RSRP, RSSI, etc. Transmitter 1308 may include hardware, firmware, and/or software code executable by a processor for transmitting data, the code comprising instructions and being stored in a memory (e.g., computer-readable medium). A suitable example of transmitter 1308 may including, but is not limited to, an RF transmitter.

Moreover, in an aspect, UE 110 may include RF front end 1388, which may operate in communication with one or more antennas 156 and transceiver 1302 for receiving and transmitting radio transmissions, for example, wireless communications transmitted by at least one base station 105 or wireless transmissions transmitted by UE 110. RF front end 1388 may be connected to one or more antennas 156 and can include one or more low-noise amplifiers (LNAs) 1390, one or more switches 1392, one or more power amplifiers (PAs) 1398, and one or more filters 1396 for transmitting and receiving RF signals.

In an aspect, LNA 1390 can amplify a received signal at a desired output level. In an aspect, each LNA 1390 may have a specified minimum and maximum gain values. In an aspect, RF front end 1388 may use one or more switches 1392 to select a particular LNA 1390 and its specified gain value based on a desired gain value for a particular application.

Further, for example, one or more PA(s) 1398 may be used by RF front end 1388 to amplify a signal for an RF output at a desired output power level. In an aspect, each PA 1398 may have specified minimum and maximum gain values. In an aspect, RF front end 1388 may use one or more switches 1392 to select a particular PA 1398 and its specified gain value based on a desired gain value for a particular application.

Also, for example, one or more filters 1396 can be used by RF front end 1388 to filter a received signal to obtain an input RF signal. Similarly, in an aspect, for example, a respective filter 1396 can be used to filter an output from a respective PA 1398 to produce an output signal for transmission. In an aspect, each filter 1396 can be connected to a specific LNA 1390 and/or PA 1398. In an aspect, RF front end 1388 can use one or more switches 1392 to select a transmit or receive path using a specified filter 1396, LNA 1390, and/or PA 1398, based on a configuration as specified by transceiver 1302 and/or processor 1312.

As such, transceiver 1302 may be configured to transmit and receive wireless signals through one or more antennas 156 via RF front end 1388. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 1302 to operate at a specified frequency and power level based on the UE configuration of the UE 110 and the communication protocol used by modem 140.

In an aspect, modem 140 can be a multiband-multimode modem, which can process digital data and communicate with transceiver 1302 such that the digital data is sent and received using transceiver 1302. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 1388, transceiver 1302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 14:
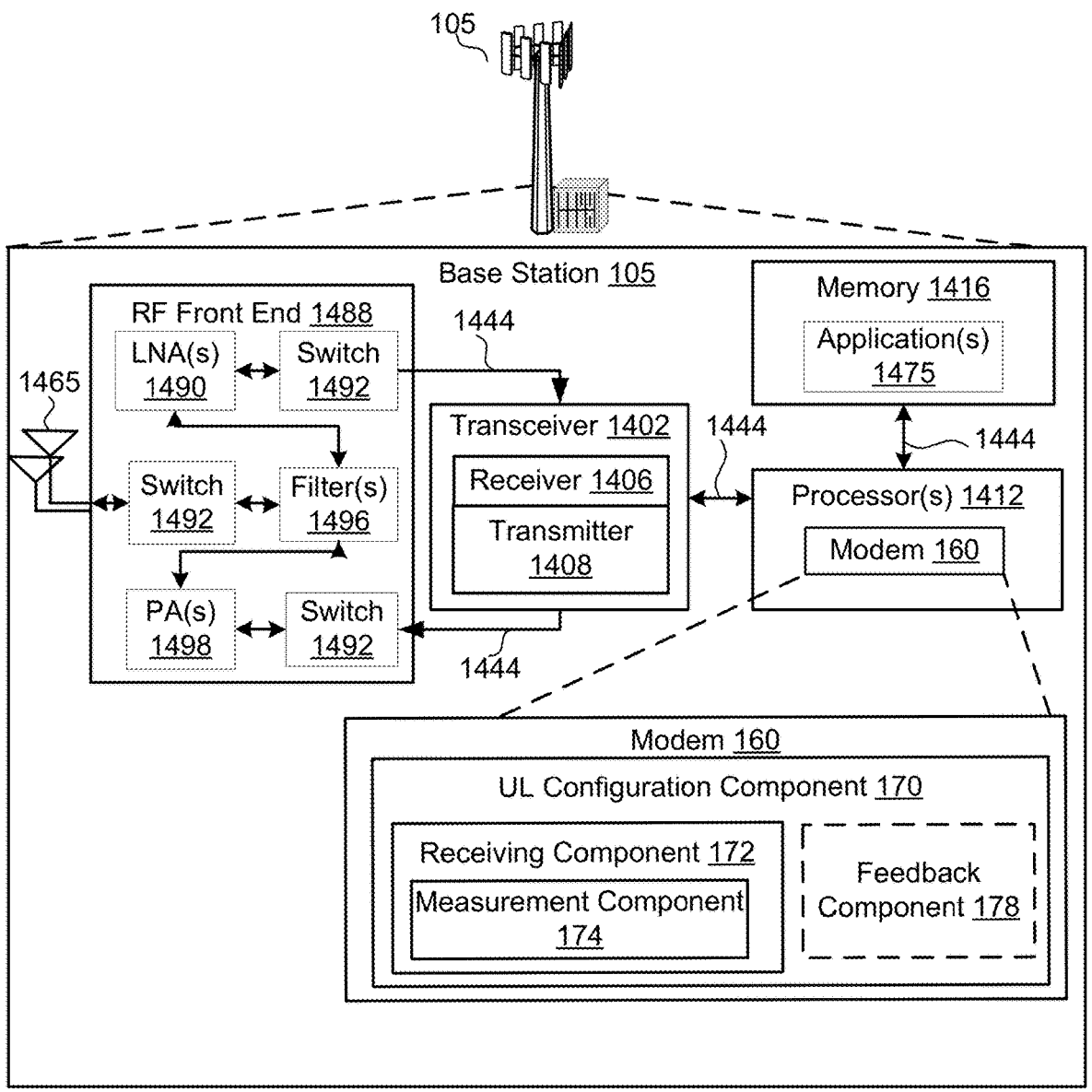
FIG. 14 is a schematic diagram of example components of the base station of FIG. 1.

Referring to FIG. 14, one example of an implementation of base station 105 may include a variety of components, some of which have already been described above, but including components such as one or more processors 1412 and memory 1416 and transceiver 1402 in communication via one or more buses 1444, which may operate in conjunction with modem 160 and UL configuration component 170 to enable one or more of the functions described herein related to UL transmit diversity The transceiver 1402, receiver 1406, transmitter 1408, one or more processors 1412, memory 1416, applications 1475, buses 1444, RF front end 1488, LNAs 1490, switches 1492, filters 1496, PAs 1498, and one or more antennas 1465 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication, comprising, at a base station:
   receiving an uplink transmission from a user equipment (UE), wherein at least a portion of the uplink transmission has been coded by the UE using a precoding matrix that varies according to a precoding cycling pattern;
   measuring the received uplink transmission to determine a preferred precoding matrix of the precoding cycling pattern; and
   indicating the preferred precoding matrix of the precoding cycling pattern to the UE via a downlink transmission.

2. The method of claim 1, wherein measuring the received uplink transmission comprises measuring a signal to noise ratio (SNR) corresponding to a symbol of the uplink transmission, or a subframe of the uplink transmission.

3. The method of claim 1, wherein measuring the received uplink transmission comprises measuring a channel estimate corresponding to the uplink transmission.

4. The method of claim 1, wherein the portion of the uplink transmission comprises at least one stream as using one of cyclic prefix orthogonal frequency division multiplexing or discrete Fourier transform spread orthogonal frequency division multiplexing.

5. The method of claim 1, wherein the portion of the uplink transmission comprises a sounding reference signal (SRS).

6. The method of claim 1, wherein the precoding cycling pattern changes the precoding matrix on a symbol basis.

7. The method of claim 1, wherein the precoding cycling pattern changes the precoding matrix on a subframe basis.

8. The method of claim 1, wherein the precoding matrix comprises a first precoding matrix if the portion of the uplink transmission comprises a physical uplink shared channel (PUSCH), and a second precoding matrix if the portion of the uplink transmission comprises a physical uplink control channel (PUCCH).

9. The method of claim 1, wherein the portion of the uplink transmission comprises a demodulation reference signal (DMRS) and a data portion.

10. The method of claim 9, wherein the precoding cycling pattern varies by subframe and one DMRS symbol is received per subframe.

11. The method of claim 9, wherein the precoding cycling pattern varies by symbol period and one DMRS symbol is received per symbol period.

12. The method of claim 1, wherein the portion of the uplink transmission comprises a data portion that coded by the UE using the precoding matrix, and wherein the uplink transmission further includes a modulation reference signal (DMRS) portion not coded by the UE using the precoding matrix.

13. The method of claim 1, wherein the precoding matrix has been selected by the UE based, at least in part, on a code division multiplexing (CDM) group of the UE.

14. The method of claim 13, wherein the portion of the uplink transmission comprises a non-coherent transmission on a physical uplink control channel (PUCCH).

15. A base station comprising:
a memory;
a transceiver; and
a processor in communication with the memory and the transceiver, wherein the processor is configured to:
receive, via the transceiver, an uplink transmission from a user equipment (UE), wherein at least a portion of the uplink transmission has been coded by the UE using a precoding matrix that varies according to a precoding cycling pattern;
measure the received uplink transmission to determine a preferred precoding matrix of the precoding cycling pattern; and
indicate the preferred precoding matrix of the precoding cycling pattern to the UE via a downlink transmission using the transceiver.

16. The base station of claim 15, wherein the processor is configured to:
measure a signal to noise ratio (SNR) corresponding to a symbol of the uplink transmission, or a subframe of the uplink transmission; and
determine the preferred precoding matrix of the precoding cycling pattern based, at least in part, on the measured SNR.

17. The base station of claim 15, wherein the processor is configured to:
measure a channel estimate corresponding to the uplink transmission; and
determine the preferred precoding matrix of the precoding cycling pattern based, at least in part, on the measured channel estimate.

18. The base station of claim 15, wherein the portion of the uplink transmission comprises at least one stream as using one of cyclic prefix orthogonal frequency division multiplexing or discrete Fourier transform spread orthogonal frequency division multiplexing.

19. The base station of claim 15, wherein the portion of the uplink transmission comprises a sounding reference signal (SRS).

20. The base station of claim 15, wherein the precoding cycling pattern changes the precoding matrix on a symbol basis.

21. The base station of claim 15, wherein the precoding cycling pattern changes the precoding matrix on a subframe basis.

22. The base station of claim 15, wherein the precoding matrix comprises a first precoding matrix if the portion of the uplink transmission comprises a physical uplink shared channel (PUSCH), and a second precoding matrix if the portion of the uplink transmission comprises a physical uplink control channel (PUCCH).

23. The base station of claim 15, wherein the portion of the uplink transmission comprises a demodulation reference signal (DMRS) and a data portion.

24. The base station of claim 23, wherein the precoding cycling pattern varies by subframe and one DMRS symbol is received per subframe.

25. The base station of claim 23, wherein the precoding cycling pattern varies by symbol period and one DMRS symbol is received per symbol period.

26. The base station of claim 15, wherein the portion of the uplink transmission comprises a data portion coded by the UE using the precoding matrix, and wherein the uplink transmission further includes a modulation reference signal (DMRS) portion not coded by the UE using the precoding matrix.

27. The base station of claim 15, wherein the precoding matrix has been selected by the UE based, at least in part, on a code division multiplexing (CDM) group of the UE.

28. The base station of claim 27, wherein the portion of the uplink transmission comprises a non-coherent transmission on a physical uplink control channel (PUCCH).

* * * * *